(12) United States Patent
Willehadson et al.

(10) Patent No.: US 7,844,708 B2
(45) Date of Patent: Nov. 30, 2010

(54) METHOD AND APPARATUS FOR LOAD SHARING AND DATA DISTRIBUTION IN SERVERS

(75) Inventors: Stefan Willehadson, Uppsala (SE); Anders Danne, Kista (SE); Max Blomme, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1082 days.

(21) Appl. No.: 10/504,128

(22) PCT Filed: Jun. 27, 2002

(86) PCT No.: PCT/SE02/01280

§ 371 (c)(1),
(2), (4) Date: Dec. 10, 2004

(87) PCT Pub. No.: WO03/069474

PCT Pub. Date: Aug. 21, 2003

(65) Prior Publication Data

US 2005/0091653 A1 Apr. 28, 2005

(30) Foreign Application Priority Data

Feb. 13, 2002 (SE) ................................. 0200418

(51) Int. Cl.
*G06F 15/173* (2006.01)
*G06F 9/46* (2006.01)
*G06F 15/177* (2006.01)

(52) U.S. Cl. ..................... 709/226; 718/100; 709/220; 709/223

(58) Field of Classification Search ................ 709/226, 709/220, 223; 718/100
See application file for complete search history.

(56) References Cited

U.S. PATENT DOCUMENTS 6,629,105 B1 * 9/2003 Young et al. ............ 707/103 R (Continued)

FOREIGN PATENT DOCUMENTS

WO 99/32956 A2 7/1999

(Continued)

OTHER PUBLICATIONS

Jonghyuck et al; "Hierarchical Cluster for Scalable Web Servers"; Conference Article, Proceedings 2001 IEEE Int Conf on Cluster Computing, Newport Beach, CA, USA, Oct. 8-11, 2001, IRN-ISBN 0-7695-1116-3.

(Continued)

*Primary Examiner*—George C Neurauter, Jr.
*Assistant Examiner*—Mark D Fearer
(74) *Attorney, Agent, or Firm*—Nixon & Vanderhye, P.C.

(57) ABSTRACT

A method and apparatus for distributing load between a plurality of servers, for handling incoming service requests in a server system. When a service request in received in an access node, a primary server is assigned out of a set of primary servers, using a first scheduling algorithm, for performing a processing task for the received service request. The first scheduling algorithm is capable of selecting any primary server. Further, a secondary server is assigned out of a set of secondary servers, using a second scheduling algorithm, for performing a storing task for the received service request. The second scheduling algorithm is capable of selecting one specific secondary servers for a storing task.

19 Claims, 3 Drawing Sheets

U.S. PATENT DOCUMENTS

| | | | |
|---|---|---|---|
| 6,839,324 B1 * | 1/2005 | Blair | 370/237 |
| 6,976,090 B2 * | 12/2005 | Ben-Shaul et al. | 709/246 |
| 2002/0023158 A1 * | 2/2002 | Polizzi et al. | 709/227 |
| 2002/0083118 A1 * | 6/2002 | Sim | 709/105 |
| 2003/0108002 A1 * | 6/2003 | Chaney et al. | 370/261 |

FOREIGN PATENT DOCUMENTS

| | | |
|---|---|---|
| WO | 01/01221 A2 | 1/2001 |

OTHER PUBLICATIONS

Mourd et al; "Scalable Web Server Architectures"; Conference Article, Proceedings, Second IEEE Symp on Computers and Communications, Alexandria, Egypt, Jul. 1-3, 1997, Publ. 1997, Los Alamos, CA, USA, ISBN 0-8186-7852-6, pp. 12-16.

Huican et al; "Scheduling Optimization for Resource-Intensive Web Requests on Server Clusters"; Conference Article, SPAA'99, Eleventh Annual Conference, Sain-Mail, France, Jun. 27-30, 1999, New York, USA, IRN-ISBN 1-58113-124-0, pp. 13-22.

* cited by examiner

METHOD AND APPARATUS FOR LOAD SHARING AND DATA DISTRIBUTION IN SERVERS

This application is the US national phase of international application PCT/SE02/01280 filed on 27 Jun. 2002, which designated the US and claims priority to SE Application No. 0200418-2 filed 13 Feb. 2002. The entire contents of these applications are incorporated herein by reference.

TECHNICAL FIELD

The present invention relates generally to a method and apparatus for distributing data and processing load between plural servers of a communication service provider. In particular, the invention is concerned with scheduling processing and storing load to achieve an efficient utilisation of computer and data storage resources.

BACKGROUND OF THE INVENTION AND PRIOR ART

A multitude of different fixed and mobile telecommunication/datacommunication services have been developed, in addition to the traditional voice calling and short text messaging. For example, Internet browsing has rapidly become very popular, and in recent years the wireless domain has converged with the Internet. Mobile terminals are now available having functionality for connecting to the Internet over a wireless access network to obtain information and services from sites and servers located anywhere throughout the world. Moreover, new technologies for mobile communication are introduced, providing greater network capacity and higher transmission bitrates. In particular, GPRS (General Packet Radio Service) and WCDMA (Wideband Code Division Multiple Access) networks are currently emerging for enabling wireless data services that require a wide range of different data rates. The data communicated in many new services may include voice, text, images, audio files and video files in various different formats and combinations.

By way of example, mobile instant messaging and presence services are rapidly becoming popular. Instant messaging is known from the world of fixed PCs (Personal Computers), including message status reporting and various group and contact list features. Presence services involve information on the location of mobile terminals and enable users to receive messages according to their profile and availability. A user profile can be personal and may be defined by preferences, interests and hobbies, as well as more temporary factors, such as user availability and current moods. Messages and content services can also be delivered depending on the present location, availability and terminal capabilities. It can be readily understood that such services require the storage of considerable amounts of retrievable user-specific data, which in many cases need to be frequently updated due to their dynamic nature.

The demands for telecommunication services are thus increasing rapidly, and service providers are established all over the world, equipped with hardware and software resources to meet these demands. In particular, means for processing service requests and data, as well as means for storing huge amounts of data are needed. Consequently, a service provider must be able to efficiently control the processing and storing means which are typically comprised in a system of different service components such as servers. The expression "server" will be used hereafter to represent any hardware and/or software for storing and/or processing data. A server may be configured to provide one or more specific services.

As seen from the examples given above, different types of stored data may be of a very dynamic nature, needing frequent updatings. Moreover, server systems must be reconfigured from time to time as the needs change for processing and storing, e.g., due to changing demands of service requests, added or removed subscribers and the introduction, modification or deletion of services. The workload on servers often increases rapidly so that individual servers are easily overloaded, at least for a short time, in particular popular web servers. To overcome overloading problems in servers, basically two solutions are available.

Firstly, an existing server may be upgraded to increase its computing and/or storing capabilities. However, the server will soon be overloaded again if the amount of service requests and/or needs for storage continue to increase, requiring further upgrading, which can be complex and costly to perform.

Secondly, it is possible to add further servers to meet a higher load. The concept of virtual servers has been proposed to provide load sharing between plural servers. A virtual server is a scalable server built on a cluster of real servers, which is transparent to end users such that the users see only a single virtual server. The front-end of the real servers is a node, sometimes called "load balancer", configured to schedule service requests to the different real servers. Scalability is achieved by transparently adding or removing a server in the cluster.

For an Internet service provider or the like controlling a plurality of servers, processing and storing load must be shared between the servers. This is necessary in order to efficiently utilise available computing and storing resources, and to handle hotspots and avoid bottlenecks. As mentioned above, large amounts of data must be stored and should also be easy to find and retrieve. Furthermore, it must be possible to efficiently execute resource demanding processing tasks, requiring one or more computers. In order to handle large amounts of the same or similar computing requests, it is quite common that these requests must be shared between plural computers.

It is thus a problem to efficiently distribute processing and storing load between a plurality of servers, yet enabling easy retrieval of stored data. In current solutions involving the distribution of data to be stored or the processing of data, a server is often allocated to a client upon a login request. The allocation scheme used for selecting a server is normally based on the current load on a predetermined set of servers, such that the server having the lowest current load, with respect to memory resources and/or CPU (Central Processing Unit) capability, etc, is selected for the client. Server allocation is typically performed by using a load manager node or the like.

The most simple current solution for load sharing is a "Round Robin" allocation scheme. Further load sharing solutions are known which are more complex, such as "Weighted Round Robin", "Least Connection", "Weighted Least Connection", "Locality Based Least Connection", "Destination Hashing" and "Source Hashing".

However, the solutions mentioned above are relatively complex to use, resulting in problems related to supervision, operation and maintenance, since it is difficult to predict where data will be distributed and stored, as well as where specific computing-intensive tasks will actually be performed. Another problem is that it is sometimes not possible to perform linear scaling of a server system, e.g., expanding resources by adding servers to the system.

Furthermore, it may be difficult to find and retrieve data being stored in one or more servers if no reference or pointer to the data is properly stored somewhere. The client performing the login may have a proper reference to the data, but no other client or device can find and retrieve the data without the reference, unless so-called "brute force searches" are used among a set of servers.

"Round Robin" scheduling is only suitable for distributing processing load, since processing tasks are not affected by in which server they are performed. On the other hand, in data storage distribution, it must be possible to find and retrieve data stored in one of several servers, which cannot be done by using Round Robin but requires the use of pointers or references as described above. Furthermore, a common basic problem with some of the other scheduling methods mentioned above, is that they use IP (Internet Protocol) addressing for scheduling. Since a plurality of clients can reside behind a single IP address (proxy, NAT, etc.), these can neither be used for data distribution nor load sharing.

BRIEF SUMMARY

The present technology reduces or eliminates the problems outlined above and provide efficient distribution of processing and storing load for incoming service requests. This is obtained by providing a method and apparatus for scheduling processing and storing load in a system of plural servers.

A service request is received in a server system comprising a plurality of servers. A primary server is assigned out of a set of primary servers, using a first scheduling algorithm, for performing a processing task for the received service request. The first scheduling algorithm is capable of selecting any primary server in the set of primary servers. Further, a secondary server is assigned out of a set of secondary servers, using a second scheduling algorithm, for performing a storing task for the received service request. The second scheduling algorithm is capable of selecting a specific secondary server in the set of secondary servers.

The first scheduling algorithm is preferably a Round Robin algorithm, and the second scheduling algorithm is preferably a hashing algorithm. Using the second scheduling algorithm may include deriving a hash number from a user ID and calculating a server ID number from the derived hash number. The following algorithm may then be used:

$$\text{server ID} = \text{hash}(\text{user ID}) \text{ modulo } n \qquad (1)$$

where n is the number of possible secondary servers, and the modulo operator providing an integer between 0 and n−1.

If a further processing task must be performed for the received service request, a primary server is assigned out of the set of primary servers, using a third scheduling algorithm being capable of selecting any primary server. The third scheduling algorithm may be the same as the first scheduling algorithm.

When using the technology, primary servers can be assigned on an IP level, where the primary servers are designated and configured for handling requests in different protocols. Furthermore, the secondary servers can be assigned on an application level, where the secondary servers are designated and configured for handling storing tasks in different service applications.

The processing task may involve any of: analysing the received service request, processing of data and running certain applications for delivering the requested service. The storing task may involve any of: storing new data, updating already stored data, and retrieving stored data.

The technology further embraces a server system comprising a plurality of servers for handling incoming telecommunication service requests. The server system includes an access node, a set of primary servers capable of performing at least one common processing task, and a set of secondary servers capable of performing at least one common storing task. The access node is connected to each primary server and each primary server is connected to each secondary server. The access node is configured to use the first scheduling algorithm to assign any primary server for performing a processing task for a received service request. Each primary server is configured to use the second scheduling algorithm to assign a specific secondary server for performing a storing task for a received service request, the specific secondary server corresponding to a client or session involved in that storing task.

Each secondary server may further be configured to use the third scheduling algorithm to assign any primary server for performing a further processing task.

The primary servers may be divided into different groups for requests in different protocols, where a first group is configured to handle HTTP (Hyper Text Transfer Protocol) requests, and a second group is configured to handle HTTPS (HTTP Secure) requests. The first scheduling algorithm is then used for a request within one of the primary server groups, depending on the service request protocol.

The access node may further comprise a primary access node being configured as a normally working node handling incoming requests, and a secondary access node being configured to monitor the activities of the primary node. The secondary access node is configured to take over the handling of requests if the primary node for some reason fails and is shut down.

BRIEF DESCRIPTION OF THE DRAWINGS

The present invention will now be described in more detail and with reference to the accompanying drawings, in which.

DESCRIPTION OF PREFERRED EMBODIMENTS

Figure 1:
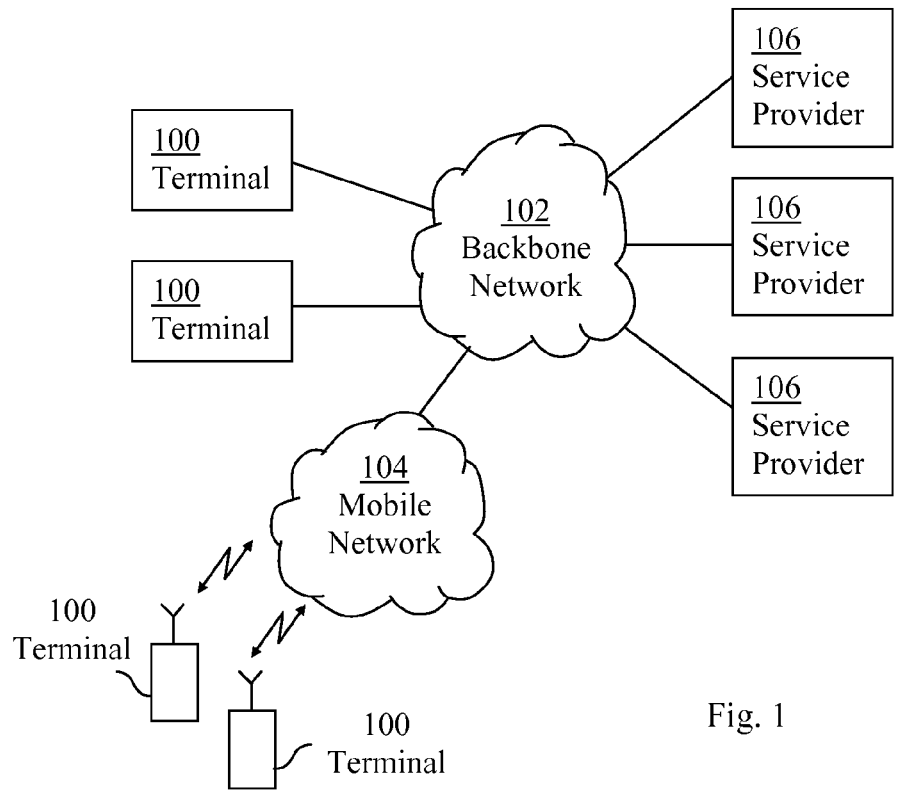
FIG. 1 is a schematic overview of a communication scenario in which the present technology can be used.

In FIG. 1, a schematic communication scenario is illustrated in which the present technology can be used. A plurality of client terminals 100 are connected to a backbone network 102, such as the Internet. The client terminals 100 may be fixed or mobile, such as wired terminals, or wireless terminals connected to a mobile access network 104 over an air interface, as indicated in the figure. A plurality of service providers 106 are likewise connected to the backbone network 102, each comprising one or more servers for executing telecommunication services requested for the client terminals 100. In reality, various further networks and/or nodes are typically involved in communication routes between clients and service providers, although not shown here for the sake of simplicity.

A client terminal 100 may thus initiate a specific telecommunication service by sending a service request over the backbone network 102 to a service provider 106. The contacted service provider then activates one or more suitable service applications in response thereto. Activating a service application may involve various processing and storing tasks, which will be discussed in more detail below.

Service applications may also be triggered without a preceding terminal request, such as through a "push" mechanism as used for example in the context of WAP (Wireless Application Protocol). A service request may thus originate from another service provider or network operator, needing data of a certain client or ongoing session. For example, a service provider may want to transmit certain information to mobile stations as they enter a specific area. In that case, the service provider will request for needed user data, such as terminal capabilities and client profile, e.g., including predefined preferences and interests.

As mentioned above, service providers are typically equipped with a plurality of servers in order to meet the demands for services from clients and other service providers. Thus, the same functionality is duplicated in several servers, thereby being capable of performing the same service tasks simultaneously for plural clients, be it data processing or storing tasks. The present technology is concerned with a method and apparatus for efficiently utilising available servers by distributing the load over the servers.

The technology utilises the fact that service tasks executed by servers can be divided into processing tasks and storing tasks. "Processing tasks" may involve analysing service requests, processing of data and running certain applications for delivering requested services. "Storing tasks" may involve storing new client-specific, session-specific or configuring data, updating already stored data, and retrieving stored data. For example, a service request may require the retrieval of certain data which is used as input for executing a specific processing task or service application.

Figure 2:
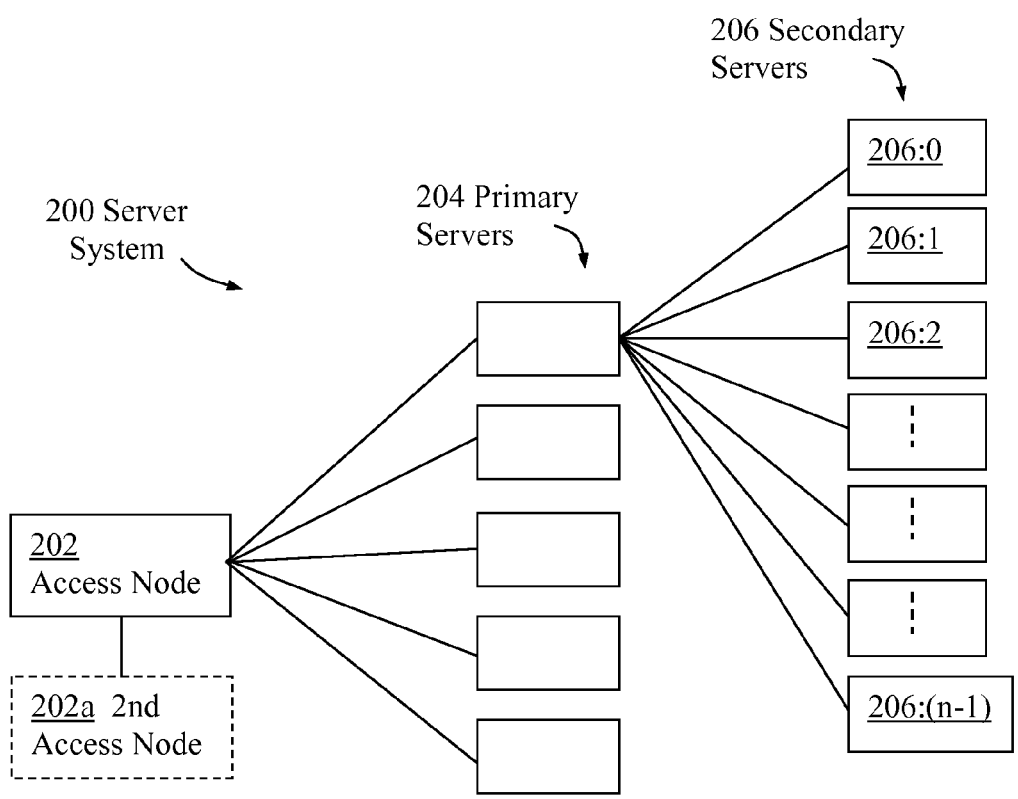
FIG. 2 is a block diagram of an exemplary server system according to one embodiment.

In FIG. 2, an exemplary server system 200 is illustrated for providing one or more services for client terminals, in accordance with an example embodiment. The server system 200 comprises an access node 202 acting as the first access point for incoming requests and data. More than one access node may be used. For example, a primary access node 202 may be configured as a normally working node handling incoming requests, where a secondary access node 202a monitors the activities of the primary node. Thereby, the secondary node 202a is configured to take over the handling of requests, if the primary node 202 for some reason fails and is shut down.

The access node 202 is connected to a set of primary servers 204, which are configured to primarily perform processing tasks. Each primary server 204 is in turn connected to a set of secondary servers 206, which are configured to primarily perform storing tasks. Thus, each secondary server 206 can be reached from all primary servers 204. The primary servers 204 are all capable of performing at least one common processing task, and the secondary servers 206 are all capable of performing at least one common storing task. The primary and secondary servers may in addition be capable of performing other tasks as well, which is however not within the scope of the present invention.

In order to distribute processing tasks over the primary servers 204, a first scheduling algorithm is used in the access node 202 for assigning a primary server 204 for performing any processing task for an incoming service request. Similarly, a second scheduling algorithm is used in each primary server 204 for distributing incoming storing tasks over the secondary servers 206.

An incoming service request for a specific client or ongoing session is thus first received in the access node 202. Then, a primary server 204 is assigned by the access node 202 to process the request, by using the first scheduling algorithm. If the service request further involves a storing task, the assigned primary server 204 applies the second scheduling algorithm for finding a secondary server 206 to perform the storing task.

The first and second scheduling algorithms are selected according to the nature of the processing and storing tasks, which are different from each other. A processing task can be performed by any of the primary servers 204, regardless of which client or session the task is directed to. It is even desirable that different primary servers 204 can be used for repeated requests for the same client in order to achieve an efficient load distribution, since the behaviour and profiles can differ between different clients. For example, one client may require more processing capacity than others by, e.g., constantly requesting more advanced service functionality or larger amounts of information.

On the other hand, storing tasks should be performed by the same secondary server 206 for each specific client, since client-specific data is preferably stored in only one secondary server assigned to that client. Otherwise, the same client-specific data must be stored in all secondary servers 206. If the storing task is storing new data for a new client, any secondary server 206 can be initially assigned for the task. However, if the storing task involves retrieving already stored data for a client, the second scheduling algorithm must always give the same result, i.e. point to the secondary server assigned to that client in which that client data is stored. Thereby, the need for using separate pointers or references to specific secondary servers is eliminated.

The same applies also for processing and storing tasks involving session-specific data. Client data and session data is hereafter collectively referred to as "user data".

In one embodiment, the primary servers may be configured to handle requests using different protocols and may be divided into different groups accordingly. For example, a first primary server group can be configured to handle HTTP (Hyper Text Transfer Protocol) requests, and a second primary server group can be configured to handle HTTPS (HTTP Secure) requests. The first scheduling algorithm is then used for only one of the primary server groups, depending on the protocol of the service request. In another embodiment, the secondary servers may be designated for specific storing tasks in different service applications. For example, the secondary servers may comprise Session servers, Instant Messaging servers, Presence servers, etc. Assigning a primary server 204 may thus be done on an "IP level", i.e. regardless of which service is requested, while assigning a secondary server 204 may be done on an "application level" depending on the type of service.

To conclude, the first scheduling algorithm is capable of selecting any primary server out of a set of primary servers, for a processing task, while the second scheduling algorithm is capable of selecting one specific server for a storing task corresponding to a client or session involved in that task. According to a preferred embodiment, a simple "Round Robin" algorithm is used as the first scheduling algorithm, and a hashing algorithm is used as the second scheduling algorithm.

A hashing algorithm means that a hash number is derived from a predetermined identity code of a client or a session, which will hereafter be collectively referred to as a "user ID". A server identity can be determined by calculating a corresponding server ID number by means of a predetermined algorithm or formula based on the derived hash number. For example, the hash number can be a simple checksum or the like for a binary code of the user ID. According to one embodiment, a secondary server 206 is determined to perform a storing task from the following algorithm:

$$\text{server ID} = \text{hash(user ID)} \bmod n \quad (1)$$

where n is the number of possible secondary servers, as indicated in FIG. 2. The modulo operator will provide an integer between 0 and n−1. For example, if four secondary servers 206:0-206:3 are available, i.e. n=4, and one particular client gives hash(user ID)=14, the server ID=2. Thus, server 206:2 is selected accordingly. For another client, hash(user ID)=16, leading to server ID=0, and so forth. Any suitable hashing function may be used on a user ID, provided that the same server ID is always derived from the same user ID.

Figure 3:
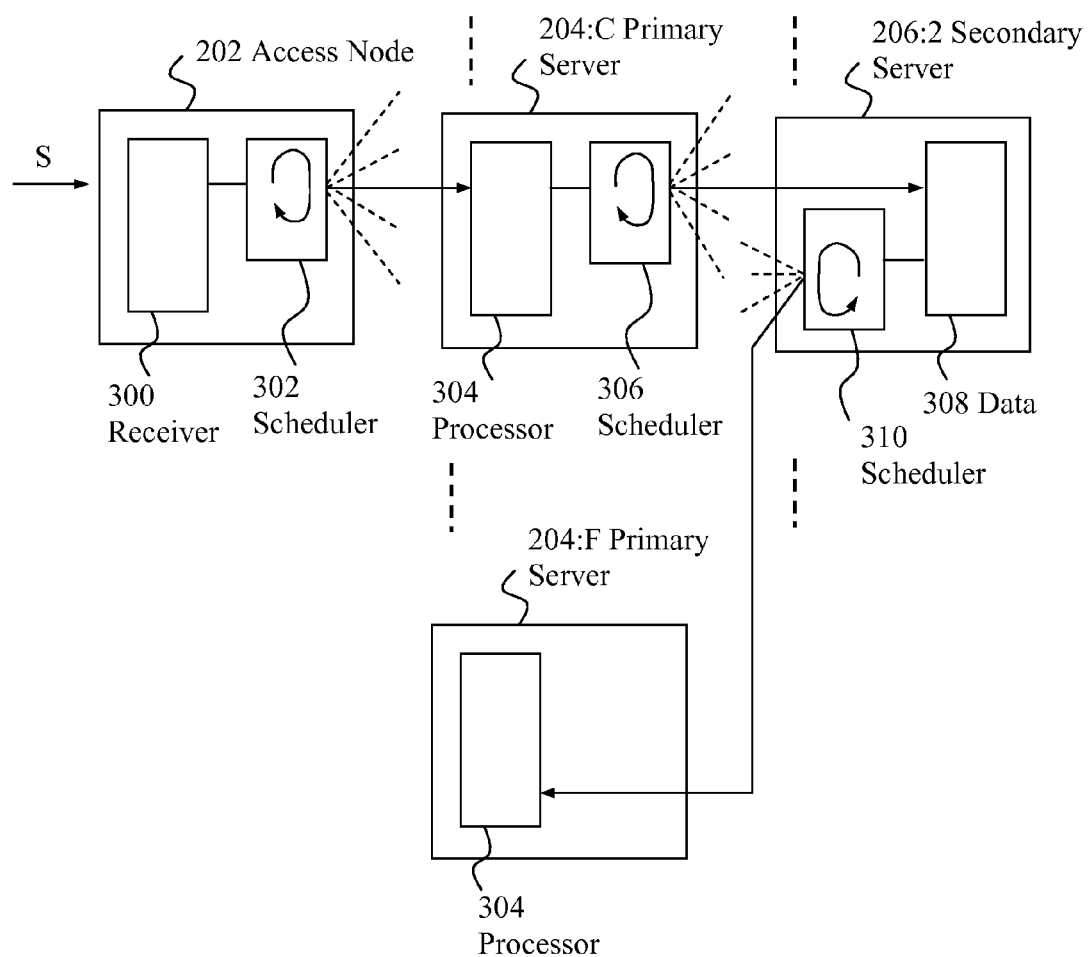
FIG. 3 is a more detailed block diagram of components in a server system involved with an incoming service request.

FIG. 3 illustrates, in more detail, components in a server system involved with an incoming service request S, partly using the same reference numbers from FIG. 2. The service request may have been sent from a client terminal 100 over the backbone network 102 to a service provider 106, as illustrated in FIG. 1, or may have originated from another service provider requesting certain user data or the like. In this example, the service request S is "forwarded" between different units, which in practice may be done by forwarding the entire request or only a part thereof or any relevant request for operations needed to handle the service request S.

The service request S is first received in a receiving unit 300 of an access node 202, and a first scheduling algorithm is applied in a scheduling unit 302 for assigning a primary server to process the request. The first scheduling algorithm is capable of selecting any primary server out of a predetermined set of primary servers. In this case, primary server 204:C is selected, wherein the service request is forwarded thereto. The primary server 204:C then processes the request accordingly in a processing unit 304.

It is then detected that specific data is needed as input to execute the requested service, such as user-specific data, subscription parameters or the like. A second scheduling algorithm is therefore applied in a scheduling unit 306 in the primary server 204:C, for finding and assigning a secondary server to perform a storing task of retrieving the needed data. The second scheduling algorithm is capable of selecting a specific secondary server out of a predetermined set of secondary servers. The second scheduling algorithm may preferably be a hashing algorithm using a specific client identification or a session identification as input. In this case, secondary server 206:2 is selected, wherein the service request, or at least a request for the needed data, is forwarded thereto for retrieving the needed data.

Next, it is detected that the requested service requires further processing work. A third scheduling algorithm is then applied in a scheduling unit 310 in the secondary server 206:2, for assigning a primary server to process the request further. The third scheduling algorithm is capable of selecting any primary server out of the predetermined set of primary servers. It should be noted that it is not required that the further processing is performed by the same primary server 204:C as previously. In this example, a primary server 204:F is selected by means of the third scheduling algorithm, wherein the service request is forwarded thereto. The third scheduling algorithm may be the same as the first scheduling algorithm, such as a Round Robin algorithm or the like, being capable of selecting any primary server.

In the following, a practical example in real life will be described, where the present technology is used. When a client sends an instant message to another user, the client sends an HTTP POST, containing an appropriate xml message, to the server system. This message is first received by a local director, which operates as an access node and handles IP-level distribution of processing load. The local director routes the request to one of several front-end servers, i.e. a primary server, using a first scheduling algorithm. Upon receiving the request, the front end server parses the xml and extracts the information needed to execute the request. The front-end server then verifies that the client has a valid session by sending a request to one of several session servers, i.e. a secondary server. Which session server to use is determined by applying a hashing algorithm, i.e. a second scheduling algorithm, to the user ID of the client. When the correct session server is found, it is checked whether the client has a session stored in the server. If no corresponding session is found, an error message is returned. Otherwise, a request is sent to an instant messaging servers. The above-mentioned hashing algorithm may be used again to select the correct one.

When the instant messaging server receives the request, an asynchronous event, containing the instant message, is sent to the front-end server. Upon receiving the event, the front end server checks if the receiver of the message has a valid session, i.e. if the receiver is logged in. If so, the event is placed in a queue in the session server and a short message is pushed to the client. A WAP push may be used for mobile clients and a UDP packet may be used for PC clients. When the client receives this message, the event is fetched from the server through an HTTP POST, thereby removing the event from the queue. If the receiving user has no valid session, the message contained in the event is stored in the instant messaging server, which then can be retrieved by the receiver upon log in.

Figure 4:
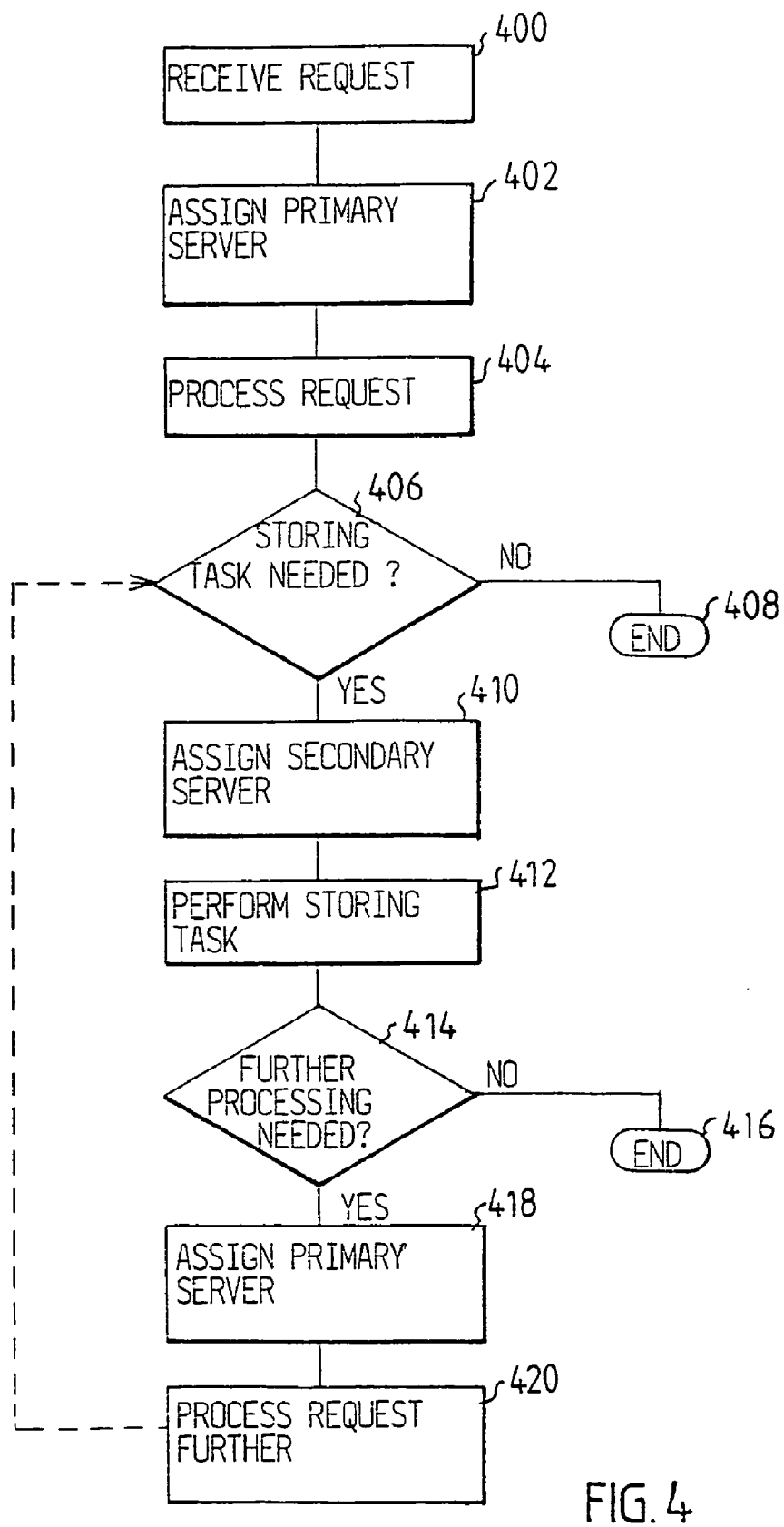
FIG. 4 is a flow chart illustrating a procedure for handling a service request.

An exemplary procedure of handling a service request will now be briefly described with reference to the flow chart shown in FIG. 4. The service request is received in a first step 400, wherein a primary server is assigned in a step 402. The request is then processed in the assigned primary server in a step 404. Thereafter, it is checked, in a step 406, whether the request requires that a storing task is performed. If not, the request handling process ends in a step 408. Otherwise, a secondary server is assigned in a step 410 and the storing task is performed accordingly in that server, in a step 412. Next, it is checked whether the request requires further processing, in a step 414. If not, the request handling process ends in a step 416. Otherwise, a new primary server is assigned in a step 418, and the request is processed further in the assigned primary server in a step 420. The new primary server may or may not be the same as the one assigned in the earlier step 402.

The process may end after step 420, or may continue by returning to step 406, as indicated by a dashed arrow in the figure, to check if any further storing task must be performed, and so forth. Hence, depending on the nature of the requested service, the request may be handled back and forth between the primary and secondary servers.

By using the described invention, the processing and storing load can be efficiently distributed in a system of servers, such that scalabillty and robustness is achieved.

The present technology enables load sharing on an IP level and data distribution on an application level, which is possible to scale linearly. The computing work for selecting which server to be assigned for handling a particular request can be performed instantly, more or less, resulting in only a small limited overhead.

The present technology may in particular be used to great advantage for services defined in the context of "Wireless Village Server", such as those relating to Instant Messaging, Presence Information and Shared Content. However, the invention is not limited to particular service applications but may be used for executing any type of service upon request.

While the invention has been described with reference to specific exemplary embodiments, the description is only intended to illustrate the inventive concept and should not be taken as limiting the scope of the invention. Various alternatives, modifications and equivalents may be used without departing from the spirit of the invention, which is defined by the appended claims.

The invention claimed is:

1. A method of handling incoming service requests in a server system comprising a plurality of servers, and for distributing load between the servers, comprising:
   A) receiving a service request for a client or session at an access node of the server system,
   B) using the access node to assign a primary server out of a set of primary servers to perform a processing task for the received service request that can be performed by any of the primary servers in the set of primary servers regardless of which client or session the task is directed to, wherein a primary server is selected for the processing task by using a first scheduling algorithm which is adapted to select any one of the primary servers in the set of primary servers, and
   C) using the primary server to assign a secondary server out of a set of secondary servers to perform a storing task for the received service request that can only be performed by a specific secondary server in the set of secondary servers, wherein the assigned primary server selects a secondary server for the storing task by using a second scheduling algorithm which is adapted to select said specific secondary server in the set of secondary servers depending on a predetermined identity code "user ID" of the client or session; and
   wherein the second scheduling algorithm is a hashing algorithm.

2. A method according to claim 1, wherein the first scheduling algorithm is a Round Robin algorithm.

3. A method according to claim 1, wherein using the second scheduling algorithm in step C) includes deriving a hash number from the user ID and calculating a server ID number from the derived a hash number.

4. A method according to claim 3, further comprising using the following algorithm:

$$\text{server ID} = \text{hash}(\text{user ID}) \text{ modulo } n \qquad (1)$$

where n is the number of possible secondary servers, and the modulo operator providing an integer between 0 and n−i.

5. A method according to claim 1, wherein primary servers are assigned on an IP level, wherein the primary servers are designated and configured for handling requests in different protocols.

6. A method according to claim 1, wherein secondary servers are assigned on an application level, wherein the secondary servers are designated and configured for handling storing tasks in different service applications.

7. A method according to claim 1, wherein the processing task involves any of:
   analysing the received service request,
   processing of data and
   running certain applications for delivering the requested service.

8. A method according to claim 1, wherein the storing task involves any of:
   storing new data,
   updating already stored data, and
   retrieving stored data.

9. A method according to claim 1, further comprising:
   D)—assigning a primary server out of the set of primary servers to perform a further processing task for the received service request, wherein a primary server is selected by using a third scheduling algorithm which is adapted to select any one of the primary servers in the set of primary servers.

10. A method according to claim 9, wherein the third scheduling algorithm is the same as the first scheduling algorithm.

11. A server system comprising a plurality of servers for handling incoming service requests, comprising:
   an access node for receiving a service request for a client or session,
   a set of computer-implemented primary servers capable of performing at least one common processing task, and
   a set of computer-implemented secondary servers capable of performing at least one common storing task,
   wherein the access node is connected to each primary server and each primary server is connected to each secondary server,
   wherein the access node is configured to use a first scheduling algorithm to assign a primary server out of a set of primary servers to perform a processing task for the received service request that can be performed by any of the primary servers in the set of primary servers regardless of which client or session the task is directed to, the first scheduling algorithm being adapted to select any one of the primary servers in the set of primary servers, and
   wherein each primary server is configured to use a second scheduling algorithm to assign a specific secondary server in the set of secondary servers to perform a storing task for the received service request that can only be performed by the specific secondary server in the set of secondary servers, assignment of the specific secondary server being dependent on a predetermined identity code "user ID" of the client or session; and
   wherein each primary server is configured to use a hashing algorithm as the second scheduling algorithm.

12. A server system according to claim 11, wherein the secondary servers are designated for storing tasks in different service applications, and comprises at least one of: Session servers, Instant Messaging servers and Presence servers.

13. A server system according to claim 11, wherein the primary servers are divided into different groups for requests in different protocols.

14. A server system according to claim 13, wherein a first primary server group is configured to handle HTTP requests, and a second primary server group is configured to handle HTTPS requests, wherein the first scheduling algorithm is used within one of the primary server groups, depending on the service request protocol.

15. A server system according to claim 11, wherein the access node is configured to use a Round Robin algorithm as the first scheduling algorithm.

16. A server system according to claim 11, wherein each primary server is configured to use the following hashing algorithm:

$$\text{server ID} = \text{hash}(\text{user ID}) \text{ modulo } n \qquad (1)$$

where n is the number of possible secondary servers, and the modulo operator providing an integer between 0 and n−1.

17. A server system according to claim 11, wherein each secondary server is configured to use a third scheduling algorithm to assign any primary server in the set of primary servers for performing a further processing task.

18. A server system according to claim 17, wherein the third scheduling algorithm is the same as the first scheduling algorithm.

19. A server system according to claim 11, wherein the access node comprises a primary access node being configured as a normally working node handling incoming requests, and a secondary access node being configured to monitor the activities of the primary node, and to take over the handling of requests if the primary node for some reason fails and is shut down.

* * * * *